United States Patent
Kaschemekat et al.

[11] Patent Number: 5,350,519
[45] Date of Patent: Sep. 27, 1994

[54] PERVAPORATION PROCESS AND USE IN TREATING WASTE STREAM FROM GLYCOL DEHYDRATOR

[75] Inventors: Jürgen Kaschemekat, Campbell; Richard W. Baker, Palo Alto, both of Calif.

[73] Assignee: Membrane Technology and Research, Inc., Menlo Park, Calif.

[21] Appl. No.: 93,819

[22] Filed: Jul. 19, 1993

[51] Int. Cl.$^5$ ............................................. B01D 61/36
[52] U.S. Cl. ................................... 210/640; 210/416.1
[58] Field of Search ...................... 210/640, 416.1, 259

[56] References Cited

U.S. PATENT DOCUMENTS

| | | | |
|---|---|---|---|
| 4,806,245 | 2/1989 | Böddeker | 210/640 |
| 4,900,402 | 2/1990 | Kaschemekat et al. | 210/640 X |
| 5,030,356 | 7/1991 | Blume et al. | 210/640 |
| 5,108,549 | 4/1992 | Wenzlaff et al. | 203/1 |
| 5,209,762 | 5/1993 | Lowell | 55/31 |

*Primary Examiner*—Frank Spear
*Attorney, Agent, or Firm*—J. Farrant

[57] ABSTRACT

Pervaporation processes and apparatus with few moving parts. Ideally, only one pump is used to provide essentially all of the motive power and driving force needed. The process is particularly useful for handling small streams with flow rates less than about 700 gpd. Specifically, the process can be used to treat waste streams from glycol dehydrator regeneration units.

49 Claims, 1 Drawing Sheet

FIG. 1

PERVAPORATION PROCESS AND USE IN TREATING WASTE STREAM FROM GLYCOL DEHYDRATOR

FIELD OF THE INVENTION

The invention concerns pervaporation processes. More specifically, the invention concerns pervaporation processes using an apparatus with few moving parts, and particularly the use of pervaporation to treat waste streams from glycol dehydrator regeneration units.

BACKGROUND OF THE INVENTION

Before natural gas can be admitted to the gas pipeline, it must be dried to prevent corrosion of the pipes or other problems associated with hydrate and ice formation.

Glycol dehydrators are widely used to remove water from natural gas. In such a unit, wet gas is scrubbed with dry glycol solution to yield a product gas with a water vapor dewpoint of $-40°$ to $-50°$ C. Triethylene, diethylene, and ethylene glycols used in dehydrators have a strong absorption affinity for certain hydrocarbons, including aromatic compounds such as benzene, toluene, xylene, and ethylbenzene. When glycols are employed to dehydrate natural gas streams, a significant portion of the aromatics present are co-absorbed with the water vapor, as are other hydrocarbon species.

Spent, water-laden glycol is passed to a regeneration system where it is heated, absorbed water is driven off and dry glycol is produced for recirculation back to the dehydrator. The glycol regeneration system typically consists of a flash tank, to remove methane and other light gases, a reboiler and a regeneration still column. The regeneration column expels a hot overhead vent stream consisting of volatile components that have been driven off from the glycol. Although the major component of this stream is steam, it may also contain as much as 20 mol % or more organic compounds, typically up to about 5 mol % light hydrocarbons (methane and ethane), up to about 10 mol % other straight-chain hydrocarbons and 5–10 mol % of the aromatic hydrocarbons benzene, toluene, ethylbenzene and xylene, together commonly known as BTEX compounds.

In many existing glycol dehydrator installations, this overhead stream flows directly to the atmosphere. However, increasingly stringent environmental legislation requires some kind of control technology to be put in place to reduce or eliminate atmospheric emissions of organic compounds. The 1990 Clean Air Act Amendments establish major sources of pollution as those that have the potential to emit 10 tons per year or more of any hazardous air pollutant (HAP) or 25 tons per year or more of any combination of HAPs. The glycol dehydration units employed by the natural gas industry are considered as major sources of hazardous emissions, principally because of the BTEX compounds that are released to the atmosphere as a result of their uncontrolled operation. Under its new guidelines, the EPA has proposed an emission limit for benzene-in-water discharges of one megagram/yr (or 2,204 lb/yr) per location. Oklahoma has set an air standard of not more than 1,200 lb/yr or more than 0.57 lb/h benzene per location. In contrast to these standards, the levels measured at one location by the EPA discovered benzene emissions of 10.1 lb/h from the reboiler vent, and 1.8 lb/h in the discharged steam condensate.

Most control technology that is already used or that has been proposed involves condensation of the overhead vent stream from the regeneration still column to produce three phases: organic liquid, water and a residual vapor vent stream. The BTEX compounds recovered from the organic liquid phase can be sold as is or remixed with other organic liquids and their value usually has a positive effect on the process economics. The organic-containing vent gas can often be recirculated to the reboiler as fuel or can be flared. A major problem, however, is the production of the water phase, saturated with organics. This phase generally contains up to about 1,500 ppmw of mixed organics, including up to about 400 ppmw aromatic BTEX compounds and 1,100 ppmw aliphatics. This stream cannot be discharged to the sewer system, but requires special handling and disposal as a hazardous waste.

Another problem associated with installation of condensation as a control technology is that condensation of the overhead vapor imposes a back pressure of at least 2 psi on the regenerator still system, and the great majority of these units are not designed to operate with back pressure.

A recently proposed alternative treatment process is described in U.S. Pat. No. 5,209,762. The process involves using the overhead vapor from the regenerator still column to steam strip the saturated water phase from the condenser. The result is a relatively clean water phase containing about 170 ppmw total organics, which may be further processed in a final polishing step if necessary. The principal disadvantage is that several large, complicated pieces of equipment are involved, making the overall process complex and relatively costly.

There remains a need, therefore, for simple, reliable, low-cost methods of controlling emissions of organic compounds from glycol regeneration operations.

SUMMARY OF THE INVENTION

The invention has several aspects. In one aspect, the invention is a process for treating the overhead stream from the regeneration still column of a glycol dehydrator. In another aspect, the invention is an apparatus for carrying out such a process. In yet other aspects, the invention applies more generally to processes and apparatus for treating liquid streams by pervaporation.

A common feature in all aspects of the invention is the use of a liquid-ring pump as the principal, or even sole, driving force for the treatment operation. The liquid-ring pump is a non-pulsating, rotary pump that compresses gas using a liquid compressant. The only moving part, the rotor, is mounted on a shaft that is offset from the center axis of the cylindrical pump body. As the rotor turns, the liquid in the pump body is thrown against the outside wall by centrifugal force and a ring of liquid forms along the body wall. Because the rotor is offset, with each revolution the liquid ring first fills each chamber between the rotor blades and then recedes. As the liquid ring begins to fill each chamber, the gas is compressed into a smaller volume, increasing the pressure.

The ultimate suction pressure of a liquid-ring pump is usually limited by the vapor pressure of the compressant or sealant liquid. For water-sealed pumps, for example, the lowest practical operating pressure is about 30–50 torr. On the discharge, or high-pressure side, a discharge pressure of up to about 5 psig can be reached. Higher discharge pressures, such as 10-15 psig can be attained if needed by using specially designed rotor chambers.

Because there is no metal-to-metal friction contact and only one moving part, these simple pumps are extremely reliable. They can also handle large amounts of entrained liquid, some entrained solids and gases saturated with condensable vapors, even when the gases and liquids are flammable. These features make them particularly suited for handling the types of liquid/gas mixtures that will be encountered in pervaporation treatment of glycol dehydrator regeneration waste streams, and for other pervaporation applications.

The process as it applies to glycol dehydrators involves using a liquid-ring pump to draw off the regeneration still overhead stream, passing it through a condenser and then sending the pressurized exhaust stream from the pump to a separator. Within the separator, three phases are formed; an organic liquid phase, containing a mixture of aromatic and aliphatic compounds, an aqueous phase, saturated with organics, and a vapor phase, containing about equal parts of light gases (methane and ethane) and $C_{3+}$ hydrocarbons. The separator can be, and preferably is, maintained at an over-pressure of about 5-15 psig by the liquid-ring pump. If the separator is maintained at a suitable over-pressure, this pressure can also be used to draw each of the three phases off from the separator, often without the need for additional circulation pumps, blowers, etc.

In particular, the over-pressure is used to drive the aqueous phase across the feed side of a pervaporation unit. Pervaporation is a separation process in which a solution containing two or more components is passed across a membrane that preferentially permeates one or more of the components. The process can be applied to the removal of dissolved water from organic solvents, to the extraction of organic solvents from water, and to the separation of mixed organic solvents.

For the present invention, the pervaporation unit is equipped with a membrane or membranes that permeate organic components preferentially over water. As the feed liquid flows across the membrane surface, the organic components pass through the membrane as a vapor. Transport through the membrane is induced by maintaining a vapor pressure on the permeate side of the membrane that is lower than the vapor pressure of the feed liquid. This reduced pressure is maintained by connecting the permeate side of the membrane to the suction side of the liquid-ring pump and optionally by condensing at least a portion of the permeate stream.

The pervaporation unit separates the aqueous phase into a residue stream, which is withdrawn from the feed side, and an organic-enriched permeate stream. Optionally, the permeate stream may be passed through a condenser to liquefy a portion of the stream. The stream is then drawn into the liquid-ring pump and exits forming part of the pressurized exhaust stream that is passed from the pump to the separator.

The pervaporation unit is capable of achieving substantial removal of the organic components that are present in the aqueous phase. Typically, it is possible to reduce the overall organic content by 90%, 95%, 99% or even 99.9%. Thus, the residue stream from the pervaporation unit can contain as little as 100 ppmw, 50 ppmw, 10 ppmw or even 1 ppmw organic or less, and is clean enough for direct discharge.

In favorable cases, the over-pressure in the separator also provides enough motive force to draw off the vapor phase and the organic liquid phase. As with existing condensation technology, the vapor phase can be used as supplementary fuel in the fire box of the reboiler, and the hydrocarbons can be recovered from the organic liquid phase as a valuable by-product.

The process of the invention has several advantages compared with other control technologies. First, no secondary waste streams are produced. This is a substantial benefit compared with processes in which a waste water stream saturated with organics is created. Secondly, the process does not require additional large pieces of equipment, such as stripping columns and cooling towers. Thirdly, the liquid-ring pump is connected on its suction side to the still overhead vent. This means that an above-atmospheric back pressure on the still column can be avoided. Finally, the process can be configured in optimum cases so that the liquid-ring pump, driven with an electric motor or from natural gas, incorporates the only moving mechanical part. This makes the process simple, reliable and attractive for use in gas fields, where supporting equipment and personnel are often not readily available.

The process as it applies to pervaporation in its more general aspects involves passing a stream for treatment through a liquid-ring pump and thence to a separator in which an over-pressure can be maintained, if desired, by the liquid-ring pump. As with the glycol dehydrator embodiments, three phases are formed in the separator; a gas phase and two liquid phases whose compositions are determined by the mutual solubilities of the components. The relative volumes of these three phases will depend a great deal on the nature of the feed stream. In the case of glycol dehydration units, the stream coming out of the regeneration still vent contains significant amounts of methane, ethane and propane, and the volume of the gaseous phase from the separator is relatively large. For many streams to be treated by pervaporation, the non-condensable gas content is much smaller, and, in some cases, only consists of air that leaks into the system on the low-pressure side, or small amounts of gases dissolved in the incoming feed liquid.

One of the liquid phases is passed to a pervaporation unit for treatment. Because the feed stream to be treated enters the process through the liquid-ring pump, it is often the case that no additional feed pump is needed to drive the feed into and through the pervaporation unit.

For the invention in this general aspect, the pervaporation unit may contain membranes that are selective for water over organic compounds, selective for organic compounds over water or selective for one type of organic over another, depending on the separation that is to be performed. As with the glycol dehydrator embodiments, a reduced pressure is maintained on the permeate side of the membrane by connecting it to the suction side of the liquid-ring pump and optionally by condensing at least a portion of the permeate stream. The enriched permeate phase is passed back through the liquid-ring pump to the separator. Most preferably, the over-pressure in the separator also provides enough motive force to draw off the gas and the other liquid phase.

In its further aspects, the invention is the apparatus used to carry out the processes described above. The apparatus combines a separator, a pervaporation unit and a liquid-ring pump. The apparatus is preferably configured in such a way that the one liquid-ring pump can provide at least a significant portion of both the pressure difference required to drive the pervaporation unit and the pumping required to move the various fluids into and out of the separator and across the feed side of the pervaporation unit. This differs from conventional pervaporation apparatus in which multiple separate pumps are used to move the feed liquid into the pervaporation unit, to lower the pressure on the permeate side, to remove non-condensed gases, to pump liquid and gaseous stream into and out of decanters, condensers, holding tanks, separators, etc. The net result is a simpler apparatus having fewer mechanical components with moving parts. In the most favorable cases, no additional pumps at all beyond the one liquid-ring pump are required to run the apparatus. In other operations, the liquid-ring pump may provide useful benefits, for example by serving as both a feed supply pump and a permeate pump for the pervaporation unit, but some additional pumping capacity may be needed to move the other phases out of the separator.

The processes and apparatus described above are particularly useful for treating small streams, typically such as 700 gpd, or about 0.5 gal/min or 2.5 L/min or less.

DETAILED DESCRIPTION OF THE INVENTION

Figure 1:
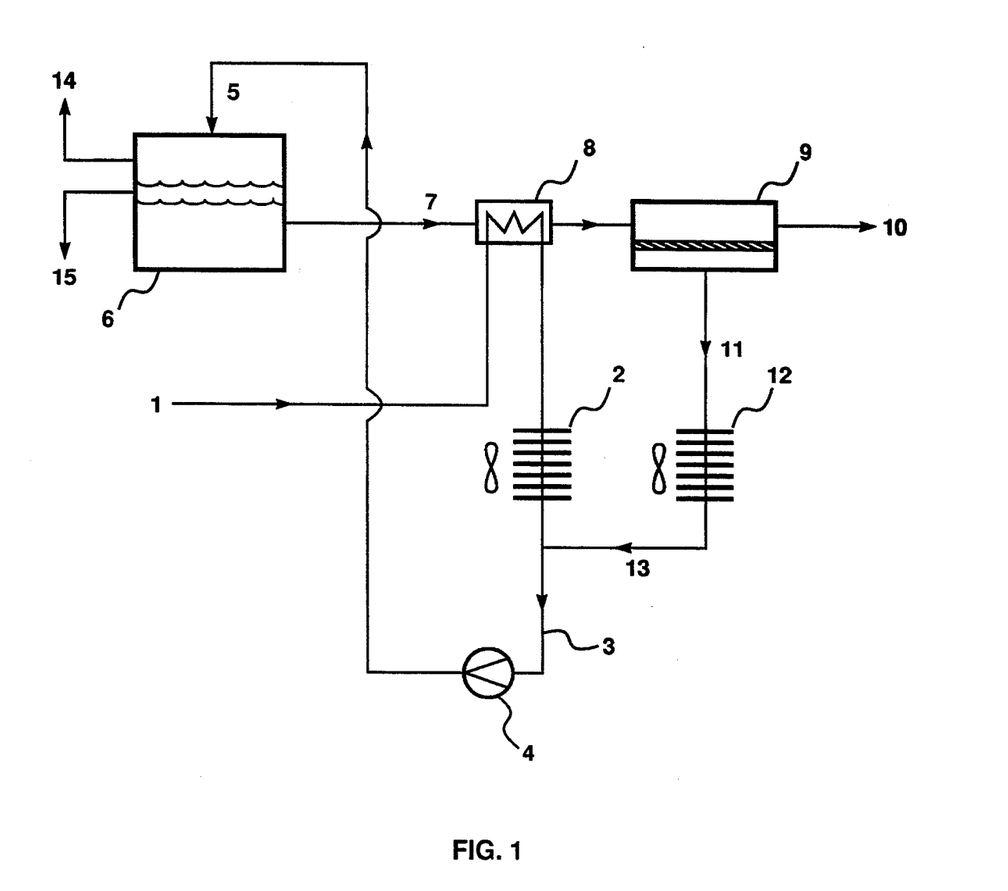
FIG. 1 is a schematic diagram of a representative process and apparatus of the invention, including optional condensers and heat exchanger.

The several aspects of the invention can be explained in more detail by referring to FIG. 1, which is a schematic diagram of a representative process or apparatus of the invention, including optional condensers and heat exchanger.

The process as it applies to glycol dehydrators can be understood by reference to FIG. 1 as follows. Stream, 1, is the regeneration still overhead stream, which is drawn off from the still column. Stream 1 as it emerges from the column is in the gaseous state, and typically consists of steam, combined with a few mol % (such as 0.1% to 5%) each of methane, ethane, propane, butane, pentane, hexane, benzene, toluene, ethylbenzene and xylene. Before passing through the liquid-ring pump, 4, stream 1 is optionally run through condenser 2. The condenser is shown as air-cooled in the figure; water or some other cooling agent could be used instead if available at the site. The condenser liquefies a portion of stream 1. Although some gas is always needed in the feed to avoid cavitation, liquid-ring pumps can handle a broad range of gas/liquid mixtures. It is possible, in principle, to omit this condensation step and pass stream 1 to the pump in gaseous form. This will, however, impose a heavy load on the pump, by way of the volume of fluid to be compressed. It is preferable, therefore, to condense at least some of the stream before it enters the pump. FIG. 1 shows the whole of stream 1 as being passed into the liquid-ring pump. If the process of the invention is carried out downstream of existing treatment equipment, it may be only a portion of the total regeneration still overhead stream that reaches the pump, since some gases and/or other components may already have been removed.

The pressurized exhaust stream, 5, from the pump passes to the separator, 6. Within the separator, three phases are formed; an organic liquid phase, an aqueous phase and a gaseous phase. Partitioning of components between the phases depends on the temperature and pressure conditions within the separator. The gaseous phase, 14, might typically consist of about 50% or more light gases (methane and ethane) that do not condense as a result of cooling in condenser, 2, or compression in pump, 4, and 50% or less of combined water vapor, $C_3$-$C_6$ straight-chain hydrocarbons and BTEX compounds. Most commonly, this gaseous phase can be drawn off and used as supplementary fuel in the fire box of the reboiler. In some situations, for example, where the process of the invention is carried out downstream of an existing gas/liquid separator, the gas phase is very small, since most of the methane, ethane or other non-condensables have already been removed. The organic liquid phase, 15, consists of essentially pure organics. The major portion is preferably a mixture of BTEX compounds, but the mixture may also contain significant amounts of liquefied aliphatics. This organic liquid is a valuable product that can be further purified as necessary and marketed as chemical feedstock or for a variety of other uses.

The third phase in the separator is the aqueous liquid, which is saturated with organic compounds under the prevalent conditions. This means that it will usually contain up to a maximum of about 1,500 ppmw mixed organics, of which up to about 400 ppm will be dissolved BTEX compounds. This aqueous phase, 7, is driven out of the separator under the pressure provided by the liquid-ring pump and passes to the feed side of pervaporation unit, 9. Optionally, a heat exchanger, 8, may be included in the line to the pervaporation unit to raise the vapor pressure on the feed side. Since the overhead stream from the regeneration still is hot, it is convenient to run this overhead stream against the feed stream to the pervaporation unit, as shown in the figure. Alternatively, some other heating medium may be used or the heat exchanger may be dispensed with and the feed may be run into the pervaporation unit without additional heating.

For the glycol dehydrator embodiments, the pervaporation unit is equipped with a membrane or membranes that permeate organic components preferentially over water. The membranes may be of any type useful for such a separation, including dense polymer membranes, ion-exchange membranes or the like, may be configured as homogeneous films, asymmetric membranes or composite membranes, may be in flat-sheet or hollow-fiber form, and may be housed in plate-and-frame modules, hollow-fiber modules or spiral-wound modules. The preparation of pervaporation membranes and modules is well known in the art and those of ordinary skill in the art will appreciate that no particular type is critical to the functioning of the process of the invention.

As the feed liquid flows across the membrane surface, the organic components pass through the membrane as a vapor. Transport through the membrane is induced by maintaining a vapor pressure on the permeate side of the membrane that is lower than the vapor pressure of the feed liquid. This reduced pressure is maintained by connecting the permeate side of the membrane to the suction side of the liquid-ring pump and optionally by condensing at least a portion of the permeate stream, 11, in second condenser, 12, which again is shown as air-cooled, but might also be cooled by water or another cooling agent. Since the volume of the permeate stream is small compared with the incoming overhead vent stream, it is acceptable, from the point of view of pump requirements, to leave the permeate stream in the vapor phase as it is sucked into the pump. However, from the point of view of the pervaporation unit requirements, some condensation of the permeate stream is desirable to keep the vapor pressure low on the permeate side.

For simplicity, FIG. 1 shows the stream, 13, exiting condenser, 12, as being mixed with the incoming stream from condenser, 2, to form a combined stream, 3, that passes into the liquid-ring pump, 4, on the suction side. A liquid-ring pump usually has two or three main component parts. If the pump is used in straight-through mode, it need consist of only two parts, the pump itself and a separator on the outlet side for separating spent compressant from the discharge gas stream. Fresh compressant is supplied to the pump continuously through the liquid inlet. If the pump is used in recirculation or closed-loop mode, it usually has three parts, the pump itself, a separator and a cooler, to cool the compressant before it is returned to the pump. It will be apparent to those of ordinary skill in the art that streams 1 and 13 need not be combined, but could be passed independently into the pump if this makes for more favorable operation under specific conditions. Thus, stream 1, if it is mostly liquid, might more preferably enter the pump on the inlet or suction side through the pump's cooler as additional compressant. Also, it is often desirable to recirculate some portion of the aqueous phase, 7, directly to the inlet side of the pump through the pump's cooler, rather than passing it to the pervaporation unit. Thus it is possible to operate the pump in a mixture of straight-through and recirculation modes.

The pervaporation unit separates the aqueous phase into a residue stream, 10, which is withdrawn from the feed side, and the organic-enriched permeate stream. A pervaporation unit is capable of achieving substantial removal of the organic components that are present in the aqueous phase. Typically, it is possible to reduce the overall organic content by at least 90%, and more preferably by more, such as 95%, 99% or 99.9%. Thus, if the feed to the pervaporation unit contains, for example, 1,400 ppmw of mixed organics, then the residue stream from the pervaporation unit can contain as little as 100 ppmw, 50 ppmw, 10 ppmw or even 1 ppmw total organic or less, and may be clean enough for direct discharge. If the water is to be discharged without further treatment, it is important to remove at least the most toxic compounds, namely benzene and the other aromatics, down to the 1 ppmw level or below, which generally means that the other organic compounds present will also be removed to this extent. If desired, however, the residue stream could be sent to an additional polishing step, such as carbon adsorption.

Likewise, it is possible to obtain substantial enrichment of the organic components in the permeate stream. If the feed to the pervaporation unit contains, for example, 1,400 ppmw of mixed organics, then the permeate stream can contain as much as 1-5 wt % organic, or more. Since the feed stream is saturated with organic compounds, the permeate stream is generally well above saturation concentration, and consists of an organic phase and an aqueous phase, which separate accordingly in the separator.

The pervaporation unit is configured by connecting a number of membrane modules together in parallel or serial flow arrangements, to form a one-stage, multistage or multistep system appropriate to the specific process parameters. The number of membrane modules used and the flow configuration depends on the separation characteristics of the membrane, the feed composition and the target composition values for the residue and permeate streams.

The process as it is shown in FIG. 1 is driven solely by liquid-ring pump 4, including the withdrawal of the organic and vapor phases from the separator. In order to drive the process using only the one pump, it is desirable to maintain a substantial over-pressure compared with atmospheric pressure in the separator, such as at least 2 psig, preferably at least 5 psig and more preferably at least 10 psig. If the liquids under treatment are viscous or have to be moved considerable distances, a specially designed pump that can achieve 15 psig or more over-pressure, or even up to 30 psig, could be used.

This is the most preferred mode of operation, because the process functions using only one moving mechanical component. This will make the process mechanically and operationally reliable and reduces maintenance requirements compared with conventional processes using multiple vacuum pumps, water pumps, etc. This operational simplicity and reliability is useful, because gas fields can be, and in the future increasingly will be, in remote locations where trained operators, back-up equipment and support facilities in general are not readily available.

However, useful embodiments are possible even if the liquid-ring pump is not the sole driving force for the process. For example, an additional pump or pumps can be used to withdraw the vapor phase and the organic product phase from the separator. This may give more satisfactory results when these phases are to be pumped some distance than relying on the over-pressure in the separator alone. Such embodiments still offer advantages over conventional designs, primarily because the liquid-ring pump serves as a feed-supply pump, a pump to remove non-condensed vapors on the permeate side and a pump to move condensed permeate liquid to its destination.

Optionally, the partial vacuum on the permeate side of the pervaporation unit may be further enhanced by installing an integrated gas ejector, powered by gas from the separator, upstream of the liquid-ring pump on the suction side.

Turning now to the pervaporation processes in general that are encompassed by the invention, these also may be illustrated by the process schematic of FIG. 1. Referring again to FIG. 1, in this case incoming stream, 1, is any stream for treatment by pervaporation. Stream 1 may consist of an organic stream, such as a solvent stream or an alcohol stream, from which water is to be removed, an aqueous stream from which a dissolved organic compound or compounds are to be removed, or a mixture of organic compounds, such as an azeotropic mixture, which is to be split into two organic fractions of different compositions. Stream 1 may already be in liquid form, in which case condenser, 2, is obviously unnecessary, or in gaseous form, in which case the same considerations as to load on the liquid-ring pump, 4, apply as were discussed for the glycol dehydrator application. Likewise, although some form of heat integration is always beneficial in pervaporation processes, heat exchanger, 8, will obviously only be useful in its position of FIG. 1 if stream 1 is hot, and even then is optional rather than essential.

Having been drawn through the liquid-ring pump, 4, the pressurized exhaust stream, 5, passes to the separator, 6. Within the separator, three phases, two liquid and one gas, are formed. The liquid phases will be an organic phase and an aqueous phase or two organic phases, depending on the content of stream 1. Partitioning of components between the phases depends on the temperature and pressure conditions within the separator and the mutual solubilities of the components.

The nature and ultimate destination of the gaseous phase, 14, will vary considerably, therefore, from process to process. In some embodiments the gaseous phase, 14, is air or mostly air, which was dissolved in, or entrained with, the incoming solution to be treated. Air can also leak into a pervaporation system on the low-pressure side. If the gaseous phase is of a volume and composition that is acceptable for environmental discharge, it may simply be disposed of by opening a valve and venting to the atmosphere. In other situations, if the gaseous phase contains substantial amounts of organic vapors, it may be passed to some additional treatment prior to venting, may be used as fuel (as in the glycol dehydrator) or may be a source of valuable recoverable materials.

One of the liquid phases, 7, is driven out of the separator, preferably under the pressure provided by the liquid-ring pump, and passes to the feed side of pervaporation unit, 9.

For the invention in this general aspect, the pervaporation unit may contain membranes that are selective for water over organic compounds, selective for organic compounds over water or selective for one type of organic over another, depending on the separation that is to be performed. The membranes and modules again may be of any type, construction and configuration that is appropriate to the specific separation to be performed. It is preferred that the pervaporation unit be capable of removing at least 90%, more preferably 95% or more, such as 99%, of the component that is to be removed from the feed stream to the pervaporation unit.

As the feed liquid flows across the membrane surface, one or more of the components in liquid phase, 7, passes preferentially through the membrane under the partial pressure gradient provided by the liquid-ring pump and optionally by condensing at least a portion of the permeate stream, 11, in second condenser, 12. For the more general pervaporation embodiments, the considerations as to whether and to what extent to condense the permeate stream, discussed above, still apply. The choices of condenser, 12, and of condenser, 2, if used, should be made according to the specific circumstances of the process and may range from air-cooled, to water-cooled, to a refrigerated chiller as necessary. The enriched permeate phase, 13, is passed back through the liquid-ring pump, either combined with the incoming stream as stream, 3, or separately, subject to the same considerations and options that were discussed above for the glycol dehydrator embodiments. Also as discussed above, it is often desirable to recirculate some portion of liquid phase, 7, directly to the inlet side of the pump through the pump's cooler, rather than passing it to the pervaporation unit, and to operate the pump in a mixture of straight-through and recirculation modes. The depleted residue stream, 10, exits the process to discharge or another appropriate destination.

The second liquid phase, 15, is shown in FIG. 1 as simply being withdraw from the separator. It will be apparent to those of ordinary skill in the art that there are situations where this phase also can undergo useful separation by pervaporation, or might be subject to other treatments, such as distillation, extraction, etc.

Most preferably, the over-pressure that can be attained in the separator provides essentially all of the motive force needed to draw off the gas and the other liquid phases from the separator and to drive the pervaporation unit. Optionally, useful embodiments are possible in which some supplementary pumps are needed, but fewer than for conventional processes. For example, an additional pump or pumps can be used to withdraw the vapor phase and/or the organic product phase from the separator, as discussed above. Alternatively, an additional feed pump can be used to provide an enhanced driving force across the feed side of the pervaporation unit, while the over-pressure created by the liquid-ring pump is used for removing one or both of the other phases from the separator.

As described above, optionally, the partial vacuum on the permeate side of the pervaporation unit may be further enhanced by installing an integrated gas ejector, powered by gas from the separator, upstream of the liquid-ring pump on the suction side.

The process of the invention is particularly useful for treating small streams, such as 1,500 gpd, or about 1 gal/min or 5 L/min, and more typically such as 700 gpd, or about 0.5 gal/min or 2.5 L/min or less, such as 100–300 gpd, or about 5–10 gal/h or 1–2 L/h. Such stream are common throughout industry. A few representative, non-limiting, examples include:

1. Wash waters from a pharmaceutical plant

Pharmaceutical plants use ethyl acetate and water to clean batch reactors. Typically, the ethyl acetate concentration in the wash stream may be in the range 2–5%, at a volume of 100–200 gal/day. To make ethyl acetate recovery viable, concentration to above the saturation concentration of 8% is required. Simultaneously, reduction of the ethyl acetate concentration in the discharge stream to less than 1,000 ppm, and preferably to less than 100 ppm, is needed.

2. Ethylene dichloride reactor condensates

A vinyl chloride plant typically produces 1,000–4,000 gal/day of reactor condensate stream containing 20,000 ppm ethylene dichloride in a two-phase ethylene dichloride/water mixture. This ethylene dichloride could be reused in the plant if it could be recovered at 95%+purity. The wastewater stream discharged from the plant should contain less than about 100 ppm ethylene dichloride.

3. Filter manufacturer's effluent

During the production of membrane cartridge filters, a manufacturer might produce a 1,000–2,000 gal/day waste stream containing 2.0 wt % methyl ethyl ketone (MEK), 0.6 wt % acetone and 0.5 wt % butanol. Many sewer districts require the solvent levels to be reduced to less than 0.1 wt % MEK, 0.05 wt % acetone and 0.01 wt % butanol before discharge. The concentration in the solvent stream must often be increased to more than 20% for solvent recycling.

4. Methyl ethyl ketone (MEK)

MEK is widely used in industry as a solvent in paint and varnish formulations. During storage, this solvent frequently becomes contaminated with water at levels up to about 1 wt %. A process that could remove this water to a level of 0.01% or less would be useful.

5. Waste solvent mixtures

Mixtures of acetone, methylene chloride and water are often found in the chemical processing industry. Separation of the mixture is difficult by conventional distillation techniques. A pervaporation process is needed to separate the methylene chloride from the mixture, leaving an acetone-rich residue that can be treated by distillation.

The scope of the invention is not intended to be limited to any particular streams, but to encompass any streams containing components that are theoretically separable by pervaporation. Dilute and concentrated streams may be treated. Representative components that may be separated from the feedstream by the process of the invention include, but are not limited to, water, phenols, toluenes, benzenes, xylenes, cresols, esters, such as ethyl acetate or butyl acetate, chlorinated hydrocarbons, such as perchloroethylene, trichloroethylene, trichloroethane, chlorinated fluorocarbons, ketones, such as methyl ethyl ketone, alcohols, such as butanol, hexanol or octanol, naphthas and aliphatic hydrocarbons, such as hexane, octane or decane, or terpenes, such as those found in various wood product streams.

Turning now to the apparatus embodiments of the invention, FIG. 1 is again helpful when viewed as a representative example including a typical, although not limiting, set of components. In its basic embodiments, the apparatus combines a separator, 6, a pervaporation unit, 9, and a liquid-ring pump, 4, in arrangement one to another as shown in FIG. 1. Feed conduit, 1, is connected to the suction side of the liquid-ring pump. Optional heat exchanger, 8, and condenser or chiller, 2, which maybe of any type, are also included in the feed line. If preferred a heater can be installed in the feed line, 7, to the pervaporation unit. The liquid-ring pump is connected on its high-pressure side to the separator, which is equipped with an inlet line, 5, and three outlet lines, 7, 14, and 15. Outlet line, 7, is connected, optionally via heat exchanger, 8, to the feed side of pervaporation unit, 9. After treatment, the residue stream passes out of the pervaporation unit through residue line, 10. Lines 11, 13, and 3 connect the permeate side of the pervaporation unit to the suction side of the liquid-ring pump. Condenser or chiller, 12, which may be of any type, is optional.

Connection of the exhaust side of the liquid-ring pump to the separator provides an over-pressure in the separator. In addition to the inlet and three outlets shown, the separator should normally be provided with a pressure-relief valve, not shown. Although it is not a preferred way to use the apparatus, this valve could be set to be open at all times, so that there is no over-pressure in the separator. In this case, it would be necessary to provide at least three supplementary pumps to move the liquid to be treated through the pervaporation unit, as well as to pump out the gas phase and the other liquid phase.

In contrast, in the preferred embodiments, the one liquid-ring pump can provide at least a significant portion of both the pressure difference required to drive the pervaporation unit and the pumping required to move the various fluids into and out of the separator and across the feed side of the pervaporation unit. If necessary, an additional pump can be included attached to any of the three outlet lines, 7, 14, and 15 to supplement the driving forces needed to move the fluids to their destinations.

In the most preferred embodiments, the one liquid-ring pump provides all of the driving forces needed to use the apparatus, so that no supplementary pumping at all is required.

The pervaporation unit can use membranes and modules of any of the types known in the art. The modules can be arranged in arrays to form a one-stage system, a multistage system, a multistep system or combinations of these.

The liquid-ring pump can be of any type including pumps in which the liquid compressant is replaced continuously, so that the pump operates in straight-through mode, and pumps in which the liquid compressant is recirculated through the separator and a cooler, to form a closed-loop system. It is also possible to configure the system to recirculate some portion of liquid from the separator, as well as drawing in fresh liquid or condensable feed, so that the pump operates in a mixture of straight-through and recirculation modes. The pump may use the condensable components present in the feed as sealant, or may use another non-volatile sealant liquid. The capacity of the pump is a matter of choice. Liquid rings pumps are available commercially with rated capacities from a few acfm up to at least 18,000 acfm. The condensing effect resulting from contact with the cool sealant liquid can significantly boost the capacities of pumps handling condensable vapors.

Optionally, the partial vacuum on the permeate side of the pervaporation unit may be further enhanced by installing an integrated gas ejector, powered by gas from the separator, upstream of the liquid-ring pump on the suction side.

The separator can be any type of three-phase separator, horizontal or vertical, that provides a long enough retention time for adequate separation of the specific phases of interest, and that comes equipped with, or can be fitted with, the appropriate connections, valves and lines. Three-phase separators useful in the apparatus and processes of the invention are available commercially, such as from Smith Industries, or made be constructed on a custom basis.

In addition to the components described above, it will be apparent to those of ordinary skill in the art that control valves should be provided as part of the piping and instrumentation to maintain suitable pressures and flows in the various parts of the apparatus. For example, residue line, 10, is generally fitted with a back-pressure valve, the setting of which determines the flow pressure of liquid to be treated across the membrane modules. Outlet line, 7, may be fitted with a flow-control valve, such as a needle valve. Outlet line, 14, may be fitted with a time- or pressure-controlled solenoid valve, and outlet line, 15, with a time- or level-controlled solenoid valve.

EXAMPLES

Example 1

A laboratory experiment was performed to determine the ability of a composite membrane with a 5 $\mu$m thick silicone rubber selective layer to separate benzene from water. The experiment was performed by circulating a volume of water containing 900 ppmw benzene across the feed side of the membrane. After 1% of the feed solution had permeated the membrane (that is, 1% stage cut), the feed solution concentration was less than 1 ppm benzene. The benzene concentration of the permeate stream was about 10 wt %. The transmembrane flux was 0.2 L/m$^2$.h. This experiment shows that very good separation between hydrophobic aromatic hydrocarbons and water can be achieved by pervaporation.

Example 2

A calculation was performed to estimate the performance of a process substantially as in FIG. 1 in treating the overhead stream from the regeneration still column of a glycol dehydrator. The calculation was based on the membrane separation properties of Example 1, in other words an ability to achieve 99.9% removal at 1% stage cut, corresponding to a membrane separation factor of about 200. For simplicity, the feed stream was assumed to consist only of water, in the form of steam, BTEX compounds and methane.

The results of the calculation are shown in Table 1, in which the stream numbers correspond to those in FIG. 1.

TABLE 1

| STREAM # | FLOW RATE | COMPOSITION |
|---|---|---|
| 1 | 40 scfm gas, condensed to 2–3 scfm gas and 0.25 gal/min liquid | 90 vol % steam, 5 vol % BTEX, 5 vol % $CH_4$ |
| 7 | 0.25 gal/min (360 gpd) | About 1,000 ppmw dissolved BTEX in water |
| 10 | 240 gpd | About 1 ppmw dissolved BTEX in water |
| 13 | 3.6 gpd | 5 wt % BTEX |
| 15 | 80 gpd | BTEX |
| 14 | 2.5 scfm | $CH_4$ |

The membrane area needed in the pervaporation unit to perform this separation was calculated to be about 1 $m^2$.

Example 3

A calculation was performed as in Example 2 to estimate the performance of a process substantially as in FIG. 1 in treating a refinery wastewater stream containing 100 ppmw benzene. Since the feed stream is already liquid, no condensation of the incoming stream is required. The membrane properties were assumed to be the same as in Examples 1 and 2.

The results of the calculation are shown in Table 2, in which the stream numbers correspond to those in FIG. 1.

TABLE 2

| STREAM # | FLOW RATE | COMPOSITION |
|---|---|---|
| 1 | 2 L/min, already liquid | 100 ppmw benzene in water |
| 7 | | About 1,000 ppmw (saturated) benzene in water |
| 10 | | About 1 ppmw benzene in water |
| 13 | | 5 wt % benzene |
| 15 | 12 g/hour | Benzene |
| 14 | 1–2 L/hour | Air |

The membrane area needed in the pervaporation unit to perform this separation was calculated to be about 1.5 $m^2$.

Example 4

A calculation was performed as in Example 3 to estimate the performance of a process substantially as in FIG. 1 in treating a liquid stream containing 2 wt % ethyl acetate in water. The membrane was assumed to be a composite membrane with a 3.5 μm silicone rubber selective layer, a transmembrane flux of 0.8 $L/m^2.h$ and a separation factor for ethyl acetate/water of about 40.

The results of the calculation are shown in Table 3, in which the stream numbers correspond to those in FIG. 1.

TABLE 3

| STREAM # | FLOW RATE | COMPOSITION |
|---|---|---|
| 1 | 5 L/min, already liquid | 2 wt % ethyl acetate in water |
| 7 | | About 8 wt % (saturated) ethyl acetate in water |
| 10 | | About 100 ppmw ethyl acetate in water |
| 13 | | 20 wt % ethyl acetate |
| 15 | 100 g/min | Ethyl acetate |
| 14 | 1–2 L/hour | Air |

The membrane area needed in the pervaporation unit to perform this separation was calculated to be about 2.5 $m^2$.

Example 5

A calculation was performed as in Example 4 to estimate the performance of a process substantially as in FIG. 1 in treating a liquid methylene chloride stream containing 1,000 ppmw water. The membrane was assumed to be a crosslinked polyvinylalcohol membrane with a transmembrane flux of 0.2 $L/m^2.h$ and a separation factor for water/methylene chloride of about 10,000.

The results of the calculation are shown in Table 4, in which the stream numbers correspond to those in FIG. 1.

TABLE 4

| STREAM # | FLOW RATE | COMPOSITION |
|---|---|---|
| 1 | 10 L/min, already liquid | 1,000 ppmw water in methylene chloride |
| 7 | | About 2,000 ppmw (saturated) water in methylene chloride |
| 10 | About 10 L/min | About 1 ppmw water in methylene chloride |
| 13 | 20 mL/min | 50 wt % methylene chloride, 50 wt % water |
| 15 | 10 mL/min | 98% water, 2% methylene chloride |
| 14 | 1–2 L/hour | Air |

The membrane area needed in the pervaporation unit to perform this separation was calculated to be about 5 $m^2$.

We claim:

1. A process for treating a waste stream from a glycol dehydrator regeneration process, comprising the steps of:
   (i) withdrawing from said regeneration process an incoming waste stream comprising steam and an organic compound;
   (ii) condensing at least a portion of said waste stream;
   (iii) passing at least a portion of the resulting at-least-partially condensed waste stream through a liquid-ring pump and thence to a separator wherein an over-pressure can be maintained by said liquid-ring pump;
   (iv) using said over-pressure at least as part of a motive force to pass an aqueous liquid stream from said separator across the feed side of a pervaporation unit having a feed side and a permeate side, on which permeate side a reduced pressure is maintained by connecting said liquid-ring pump on its suction side to said permeate side;

(v) withdrawing from said feed side a water stream depleted in organic compound compared with said aqueous liquid stream;

(vi) withdrawing from said permeate side a permeate stream enriched in organic compound compared with said aqueous liquid stream, passing said permeate stream through said liquid-ring pump and returning it on the high-pressure side to said separator;

(vii) using said over-pressure at least as part of a motive force to withdraw uncondensed gas from said separator;

(viii) using said over-pressure at least as part of a motive force to withdraw an organic liquid phase from said separator.

2. The process of claim 1, wherein said incoming waste stream contains an organic compound chosen from the group consisting of benzene, toluene, ethylbenzene and xylene.

3. The process of claim 1, further comprising drawing said permeate stream through an integrated gas ejector upstream of said liquid-ring pump.

4. The process of claim 1, wherein said step (iv) comprises:

(iv) using said over-pressure at least as part of a motive force to pass an aqueous liquid stream from said separator through a heater and thence across the feed side of a pervaporation unit having a feed side and a permeate side, on which permeate side a reduced pressure is maintained by connecting said liquid-ring pump on its suction side to said permeate side.

5. The process of claim 4, wherein said heater comprises a heat exchanger wherein said aqueous liquid stream passes in heat-exchanging relationship with said incoming waste stream.

6. The process of claim 1, wherein said step (vi) comprises:

(vi) withdrawing from said permeate side a permeate stream enriched in organic compound compared with said aqueous liquid stream, condensing at least a portion of said permeate stream and passing the resulting at-least-partially condensed permeate stream through said liquid-ring pump and returning it on the high-pressure side to said separator.

7. The process of claim 1, wherein said liquid-ring pump provides essentially all of the motive force required to move fluids into, out of, and through said separator and said pervaporation unit.

8. The process of claim 1, further comprising providing additional pumping capacity to withdraw said uncondensed gas from said separator.

9. The process of claim 1, further comprising providing additional pumping capacity to withdraw said organic liquid phase from said separator.

10. The process of claim 1, wherein said water stream depleted in organic compound contains less than 100 ppmw total organic compound.

11. The process of claim 1, wherein said water stream depleted in organic compound contains less than 50 ppmw total organic compound.

12. The process of claim 1, wherein said water stream depleted in organic compound contains less than 10 ppmw total organic compound.

13. The process of claim 1, further comprising diverting a portion of said aqueous liquid stream to recirculate directly into said liquid-ring pump.

14. Liquid-treating apparatus, comprising a feed conduit, a separator having an inlet and three outlets, a pervaporation unit having a feed side and a permeate side, and a liquid-ring pump having a high-pressure side and a suction side, wherein;

(i) an over-pressure can be maintained in said separator by connecting said liquid-ring pump on its high-pressure side to said inlet of said separator;

(ii) one of said outlets of said separator is in liquid-transmitting connection with said feed side of said pervaporation unit;

(iii) said permeate side of said pervaporation unit is maintained at reduced pressure by connecting said liquid-ring pump on its suction side to said permeate side;

(iv) said feed conduit is connected to said liquid-ring pump so that fluid flowing in said feed conduit can pass into said liquid-ring pump;

(v) said over-pressure is sufficient at least to provide part of a motive force to drive a liquid stream from one of said outlets of said separator across said feed side of said pervaporation unit and is sufficient at least to provide part of a motive force to drive withdrawal of a second liquid stream from the second outlet of said separator and withdrawal of a gaseous stream from the third outlet of said separator;

(vi) said reduced pressure is sufficient to drive transmembrane permeation in said pervaporation unit.

15. The apparatus of claim 14, further comprising a condenser positioned between said permeate side of said pervaporation unit and said suction side of said liquid-ring pump.

16. The apparatus of claim 14, further comprising a condenser positioned in said feed conduit upstream of said liquid-ring pump to create a liquid or partially liquid stream to be treated by said apparatus.

17. The apparatus of claim 14, further comprising a heater positioned so as to heat liquid passing from said separator to said pervaporation unit.

18. The apparatus of claim 17, wherein said heater comprises a heat exchanger wherein said liquid passing from said separator to said pervaporation unit is heated by passing in heat-exchanging relationship with an incoming fluid flowing in said feed conduit.

19. The apparatus of claim 14, wherein said liquid-ring pump provides essentially all of the motive force required to move fluids into, out of and through said apparatus.

20. The apparatus of claim 14, further comprising an additional pump positioned in liquid-transmitting connection between said separator and said pervaporation unit.

21. The apparatus of claim 14, further comprising an additional pump for pumping a gas phase out of said separator.

22. The apparatus of claim 14, further comprising an additional pump for pumping a second liquid stream out of said separator.

23. The apparatus of claim 14, further comprising an integrated gas ejector positioned between said permeate side and said suction side of said liquid-ring pump.

24. The apparatus of claim 14, further comprising a connecting line to divert a portion of liquid that would otherwise pass to said pervaporation unit to recirculate directly into said liquid-ring pump.

25. A pervaporation process, comprising the steps of:
(i) passing a stream for treatment by pervaporation through a liquid-ring pump and thence to a separator wherein an over-pressure can be maintained by said liquid-ring pump;
(ii) using said over-pressure at least as part of a motive force to pass a first liquid phase from said separator across the feed side of a pervaporation unit having a feed side and a permeate side, on which permeate side a reduced pressure is maintained by connecting said liquid-ring pump on its suction side to said permeate side;
(iii) withdrawing from said feed side a liquid stream depleted in one component compared with said first liquid phase;
(iv) withdrawing from said permeate side a permeate stream enriched in said one component compared with said first liquid phase; passing said permeate stream through said liquid-ring pump and returning it on the high-pressure side to said separator;
(v) using said over-pressure at least as part of a motive force to withdraw a gaseous phase from said separator;
(vi) using said over-pressure at least as part of a motive force to withdraw a second liquid phase from said separator.

26. The process of claim 25, wherein said stream for treatment by pervaporation comprises water.

27. The process of claim 25, wherein said stream for treatment by pervaporation comprises an organic compound.

28. The process of claim 25, wherein said stream for treatment by pervaporation comprises at least two organic compounds.

29. The process of claim 25, wherein said first liquid phase comprises water.

30. The process of claim 25, wherein said first liquid phase comprises an organic liquid.

31. The process of claim 25, wherein said second liquid phase comprises an organic liquid.

32. The process of claim 25, wherein said second liquid phase comprises water.

33. The process of claim 25, wherein said gaseous phase comprises organic vapor.

34. The process of claim 25, wherein said gaseous phase comprises air.

35. The process of claim 25, further comprising drawing said permeate stream through an integrated gas ejector upstream of said liquid-ring pump.

36. The process of claim 25, wherein said step (ii) comprises:
(ii) using said over-pressure at least as part of a motive force to pass a first liquid phase from said separator through a heater and thence across the feed side of a pervaporation unit having a feed side and a permeate side, on which permeate side a reduced pressure is maintained by connecting said liquid-ring pump on its suction side to said permeate side.

37. The process of claim 36, wherein said heater comprises a heat exchanger wherein said first liquid phase passes in heat-exchanging relationship with said stream for treatment by pervaporation.

38. The process of claim 25, wherein said step (iv) comprises:
(iv) withdrawing from said permeate side a permeate stream enriched in said one component compared with said first liquid phase, condensing at least a portion of said permeate stream and passing the resulting at-least-partially condensed permeate stream through said liquid-ring pump and returning it on the high-pressure side to said separator.

39. The process of claim 25, further comprising condensing at least a portion of said stream for treatment by pervaporation prior to step (i).

40. The process of claim 25, wherein said stream for treatment by pervaporation has a flow rate less than about 1,500 gpd.

41. The process of claim 25, wherein said stream for treatment by pervaporation has a flow rate less than about 700 gpd.

42. The process of claim 25, wherein said stream for treatment by pervaporation has a flow rate less than about 300 gpd.

43. The process of claim 25, wherein said liquid-ring pump provides essentially all of the motive force required to move fluids into, out of and through said separator and said pervaporation unit.

44. The process of claim 25, further comprising providing additional pumping capacity to withdraw said gaseous phase from said separator.

45. The process of claim 25, further comprising providing additional pumping capacity to withdraw said second liquid phase from said separator.

46. The process of claim 25, further comprising providing additional pumping capacity to pass said first liquid phase from said separator to said pervaporation unit.

47. The process of claim 25, wherein said liquid stream is depleted by at least 90% in said one component compared with said first liquid phase.

48. The process of claim 25, wherein said liquid stream is depleted by at least 95% in said one component compared with said first liquid phase.

49. The process of claim 25, wherein said liquid stream is depleted by at least 99% in said one component compared with said first liquid phase.

* * * * *

UNITED STATES PATENT AND TRADEMARK OFFICE
CERTIFICATE OF CORRECTION

PATENT NO. : 5,350,519
DATED     : September 27, 1994
INVENTOR(S) : Jurgen Kaschemekat, Richard W. Baker It is certified that error appears in the above-identified patent and that said Letters Patent is hereby corrected as shown below:

In column 1, line 5, before "FIELD OF THE INVENTION", please insert --This invention was made with Government support under Contract Number DE-FG03-91ER81129 awarded by the Department of Energy. The Government has certain rights in this invention.--

Signed and Sealed this

Tenth Day of January, 1995

Attest:

BRUCE LEHMAN

Attesting Officer  Commissioner of Patents and Trademarks